June 28, 1960  B. E. HOUSE  2,942,696
BRAKE SHOE POSITIONING DEVICE
Filed Jan. 13, 1956  2 Sheets-Sheet 1
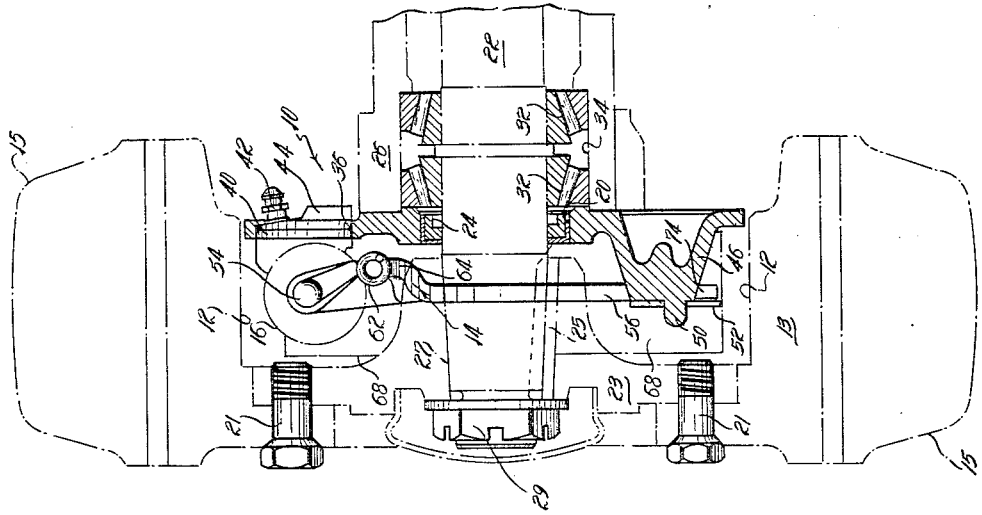
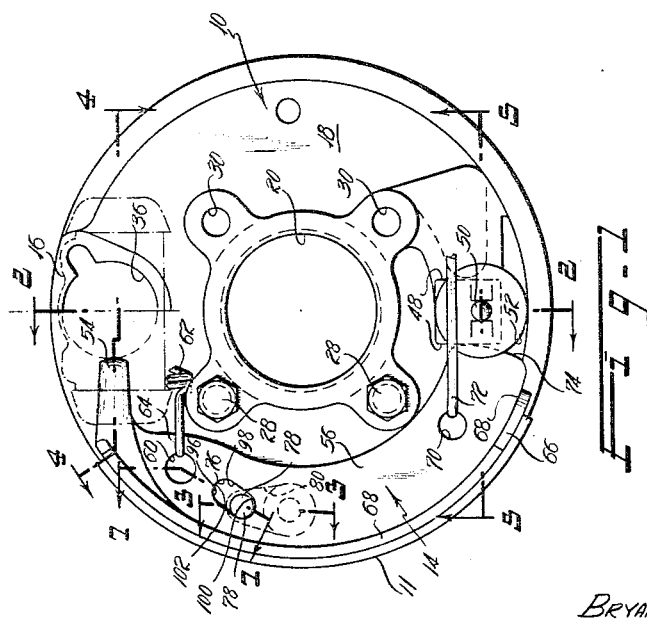
INVENTOR
BRYAN E. HOUSE
BY
ATTORNEYS

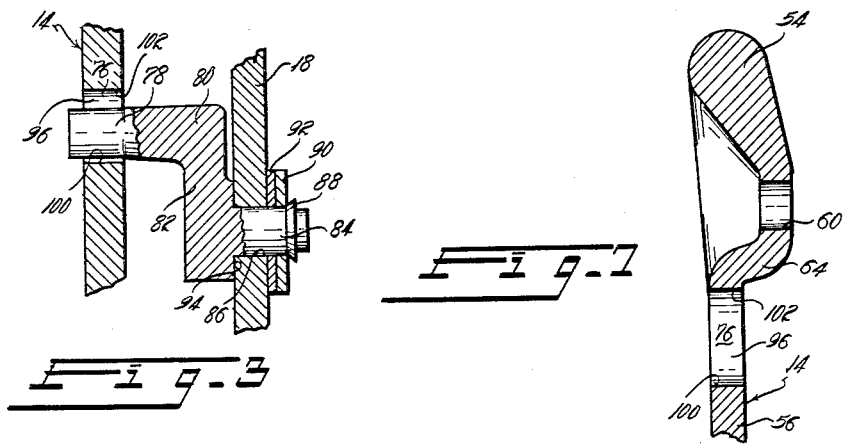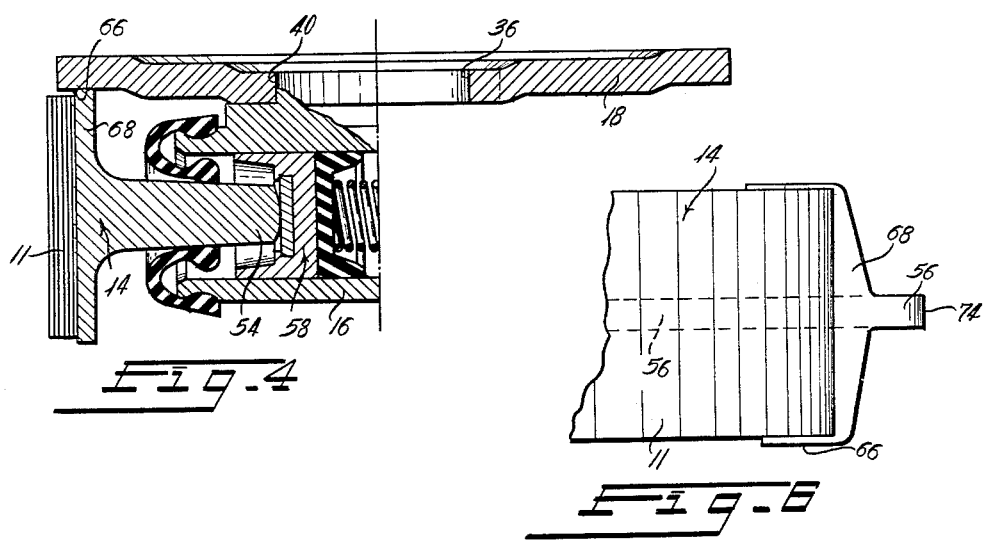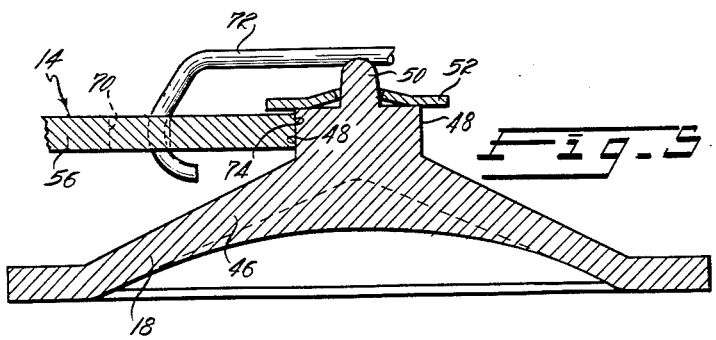

US Patent Office
2,942,696
Patented June 28, 1960

2,942,696

BRAKE SHOE POSITIONING DEVICE

Bryan E. House, Ashtabula, Ohio, assignor to Rockwell-Standard Corporation, a corporation of Pennsylvania Filed Jan. 13, 1956, Ser. No. 559,044

1 Claim. (Cl. 188—78)

This invention relates to improvements in vehicle brakes and has particular reference to a small diameter heavy duty hydraulic brake with floating shoes and an automatic shoe return adjustment.

A feature of the present invention is the provision in a brake mechanism of an automatic shoe return adjustment means which automatically compensates for lining wear to maintain shoe return movement relatively constant at an ideal setting during the entire brake lining life. The present invention is particularly useful in heavy duty brakes which are subject to relatively rapid brake lining wear, such as lift truck brakes, due to the elimination of the need for frequent manual brake adjustment.

The primary object of this invention is, therefore, to provide a heavy duty small diameter internally expansible brake mechanism having an automatic shoe return adjustment.

Another object is to provide, in an internally expansible brake mechanism, a shoe return adjustment for each brake shoe which is automatically set by shoe actuation as the shoe lining wears.

A further object is to provide an internally expansible brake mechanism having floating shoes which, during operation, automatically conform to the drum at all times during brake actuation and which have relatively constant balanced shoe actuating and return strokes throughout the brake lining life.

Another object is to provide an internally expansible brake mechanism having an automatic predetermined brake adjustment effective throughout the entire brake lining life to eliminate entirely the need for manual brake shoe return adjustments.

A further object is to provide, in an internally expansible brake mechanism, a shoe return mechanism automatically adjustable and embodying a shoe slot adjusted crank which is spring friction position loaded to the brake backing plate.

Another object is to provide an internally expansible brake mechanism having off center loading of the brake shoes by the shoe return spring to bias the shoes into bearing contact with the brake backing plate to dampen shoe vibration.

A further object is to provide, for use in a heavy duty internally expansible brake mechanism, a backing plate formed of a malleable casting having an integral abutment boss and an abutment boss top nib adapted to receive a shoe aligning and retaining spring lock washer.

These and other objects of the present invention will become more fully apparent by reference to the appended claim and as the following detailed description proceeds in connection with the accompanying drawings wherein:

Figure 1 is a partial end view of the brake mechanism of the present invention illustrating at the left the assembled brake structure and at the right the structure with the brake shoe and hydraulic wheel cylinder removed.

Figure 2 is a fragmentary sectioned view of the brake mechanism taken along line 2—2 of Figure 1.

Figure 3 is a fragmentary sectioned view of the automatic shoe return adjusting means, taken along line 3—3 of Figure 1.

Figure 4 is a partial sectioned view of the hydraulic cylinder in the brake taken along line 4—4 of Figure 1.

Figure 5 is a partial sectioned view of the shoe anchor abutment taken along line 5—5 of Figure 1.

Figure 6 is a fragmentary view of the pivoted end of one of the brake shoes.

Figure 7 is a fragmentary sectional view of the shoe web taken along line 7—7 of Figure 1 illustrating shoe return spring offset connecting means.

Referring now to the drawings, and more particularly to Figures 1 and 2, the illustrated brake assembly 10 comprises, in general, a brake drum 12, a pair of opposed internally expansible arcuate brake shoes 14 having linings 11 for braking engagement with the internal cylindrical brake drum surface 12, a hydraulically actuated wheel cylinder 16 and a backing plate 18. Brake drum 12 is integral with the wheel rim 13 which may be adapted, as shown, to receive a solid tire 15 or a pneumatic tire. Wheel rim 13 is secured by bolts 21 to the radial flange at wheel hub 23 which has an internally tapered bore and which is keyed at 25 to a similarly tapered end section 27 of axle shaft 22. Hub 23 is held on axle tapered end 27 by axle end nut 29 received on the threaded end of axle shaft 22.

Backing plate 18, which, in general configuration, is a flat disc, has a central boss having a coaxial aperture 20 through which axle shaft 22 extends. Oil seal 24 is mounted on axle shaft 22 within aperture 20 to prevent loss of oil from axle shaft housing 26. Backing plate 18 is mounted on the end of axle shaft housing 26 by equiangularly spaced bolts 28 which pass through backing plate openings 30 and are threaded into aligned tapped holes in the end of housing 26. Opposed roller thrust bearings 32, which are retained in opening 34 at the end of axle shaft housing 26 by backing plate 18, journal the shaft 22. Opening 36 in backing plate 18 is provided to receive hydraulic wheel cylinder 16 which is bolted to backing plate 18 and has a boss 40 piloted in opening 36. Bleeder valve 42 and hydraulic coupling boss 44 integral with boss 40 project through the opening 36 as shown in Figure 2.

Backing plate 18 is preferably a malleable casting having an integral abutment boss 46 which projects axially from the plane of the main portion of the plate 18 into the brake 10. Boss 46 is formed with oppositely facing parallel planar shoe abutment faces 48, one for each shoe 14, and with an abutment boss top nib 50. Spring lock washer 52, having a diameter greater than the space between faces 48, is placed on nib 50 to retain the pivoted ends of shoes 14 in alignment with abutment faces 48 axially of the brake mechanism without restraining their movement along faces 48. Faces 48 are parallel to and equally spaced from a plane through the axis of the brake mechanism bisecting the wheel cylinder.

Shoes 14 are each formed with a generally cylindrical projection 54 forming an integral continuation of shoe web 56. Projections 54 project into the open ends of the hydraulic cylinder 16 to operatively engage the respective opposed hydraulic cylinder piston assemblies 58. Openings 60 are provided in the web 56 of each of the shoes 14 adjacent their actuated ends to receive the ends of shoe return spring 62. Each shoe web 56 is formed with a projection 64 offset toward the backing plate 18 so that the line of action of return spring 62 between openings 60 of each shoe 14 is off center toward backing plate 18 relative to the center plane of the shoes. By this construction, spring 62 is effective to bias shoes 14 into bearing contact with backing plate 18 to dampen shoe vibrations. Three equally circumferentially spaced bearing pads 66 are provided on the edge of the arcuate shoe table 68 of each shoe 14 (see Figures 4 and 6) for bearing contact with backing plate 18. Openings 70 are provided in the web 56 of each of the shoes 14 adjacent their pivoted ends to receive the ends of clip type spring 72 (Figures 1 and 5) to hold the curved abutment end 74 of each floating shoe web 56 in rockable and slidable engagement with the respective abutment boss faces 48.

The web 56 of each shoe 14 is provided with an elongated slot 76 adjacent to the offset projection 64 thereof. A crank throw pin 78, which is of a smaller diameter than the width of a slot 76, projects through the respective slots 76. Each pin 78 is an integral part of a member 80 (Figures 1 and 3) with pin 78 at one end of a body 82 and a pivot pin 84 at the other end. Each pin 84 is received in a free fit through a backing plate opening 86 and is shear riveted 88 at the end to hold flat washer 90 in place. A concave plate spring 92, preferably of the type known as a Belleville spring washer, which is resiliently compressed between washer 90 and backing plate 18, resiliently biases friction surface 94 of crank throw member 80 into frictional engagement with the backing plate 18 to frictionally retain member 80 in its set position.

The difference between the diameter of pin 78 and the width of the coacting slot 76 establishes the magnitude of the shoe actuating or return movement for each brake shoe 14. The difference between the diameter of pin 78 and the width of slot 76 is determined in design to provide a constant magnitude of play between the returned and actuated positions of the brake shoes for the entire brake lining life. The limit of return movement of shoe 14 when the brake is deactuated is established by abutment of slot edge 96 with pin 78 because the force of return spring 62 is insufficient to overcome the frictional engaging forces between member 80 and backing plate 18 holding member 80 stationary. However, as brake lining 11 wears and brake 10 is repeatedly actuated, hydraulic wheel cylinder 16 exerts sufficient force to actuate shoes 14 and to overcome the frictional retaining force and move crank throw pin 78 progressively radially outward consistent with shoe lining 11 wear as slot edge 98 repeatedly abuts the pin 78. With each increment of shoe lining wear the frictional rotational holding engagement between member 80 and backing plate 18 is overcome and crank throw member 80 is rotated a compatible incremental distance to a new position in which it is retained by frictional rotational holding engagement with backing plate 18. Thus it is apparent that while the magnitude of brake shoe 14 play remains constant the location of the return limit of the stroke of each brake shoe is automatically adjusted outward throughout the entire brake lining life. This provides a constant magnitude of brake shoe movement to fully engaged position in contact with drum 12.

Shoe web slots 76 are extended from end 100 to end 102 to allow for the gradual floating shift of each shoe 14 consistent with lining 11 wear from the initial floating rocking contact position of shoe end 74 with the respective abutment surface 48 when shoe lining 11 is new as shown in Figure 1 with pin 78 adjacent slot end 100. As lining 11 wears, shoe 14 as a unit gradually shifts downwardly relative to the mechanism as viewed in Figure 1 to conform to the brake drum. When shoe lining 11 is completely worn, the floating shoe 14 is low relative to the brake 10 and walls 98 and 96 of slot 76 contact pin 78 adjacent to end 102 of slot 76 as the brake is actuated and deactuated.

In operation, when hydraulic cylinder 16 is actuated, shoe web projections 54 are pushed apart to urge shoes 14 into engagement with drum 12. Engagement of shoes 14 with drum 12 centers floating shoes 14 with respect to the drum 12 and determines the position of contact between rockable shoe end 74 and abutment face 48 throughout shoe lining 11 life.

From the foregoing it is apparent that there is hereby provided a new improved small diameter heavy duty hydraulic brake with floating shoes and an automatic shoe return adjustment. It provides a shoe return adjustment means for each brake shoe which is automatically set by shoe actuation as the shoe lining years. It is an automatic brake shoe return adjustment determined at the engineering level for entire brake shoe lining life. It provides a brake shoe return limiting crank member with a throw pin through a shoe web slot which is spring friction position loaded to the brake backing plate.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is to be claimed and desired to be secured by United States Letters Patent is:

In an internally expansible brake mechanism, a support for a pair of self-centering oppositely facing arcuate lined brake shoes, an abutment on said support for engagement by the brake shoes at one end thereof and adapted to provide a rockable and slidable pivot therefor, an actuator on said support for engagement with the opposite ends of the brake shoes, said support being a brake backing plate and said abutment being a boss formed integral with said backing plate and having spaced parallel shoe abutment faces and an axially projecting nib, and a spring lock washer mounted on and gripping said nib; said washer being of such size as to extend beyond said abutment boss shoe abutment faces to overlap the adjacent ends of the shoes to maintain axial alignment between said abutment and said shoes.

References Cited in the file of this patent

UNITED STATES PATENTS

| | | |
|---|---|---|
| 2,347,219 | Schnell | Apr. 25, 1944 |
| 2,372,322 | Goepfrich | Mar. 27, 1945 |
| 2,509,643 | House | May 30, 1950 |
| 2,544,030 | House | Mar. 6, 1951 |
| 2,718,284 | Anderson | Sept. 20, 1955 |
| 2,770,333 | Smith | Nov. 13, 1956 |

FOREIGN PATENTS

| | | |
|---|---|---|
| 914,198 | France | June 17, 1946 |
| 885,631 | Germany | Aug. 6, 1953 |
| 306,269 | Great Britain | Feb. 21, 1929 |